(12) United States Patent
Tran et al.

(10) Patent No.: US 11,961,301 B2
(45) Date of Patent: Apr. 16, 2024

(54) IMAGE-BASED OBJECT RECOGNITION METHOD AND SYSTEM BASED ON LEARNING OF ENVIRONMENT VARIABLE DATA

(71) Applicant: SMARTINSIDE AI Inc., Suwon-si (KR)

(72) Inventors: Dai Quoc Tran, Suwon-si (KR); Yun Tae Jeon, Gumi-si (KR); Tae Heon Kim, Goyang-si (KR); Min Soo Park, Gwangju (KR); Joo Ho Shin, Pyeongtaek-si (KR); Seung Hee Park, Seongnam-si (KR)

(73) Assignee: SMARTINSIDE AI INC., Suwon-si (KR)

( * ) Notice: Subject to any disclaimer, the term of this patent is extended or adjusted under 35 U.S.C. 154(b) by 0 days.

(21) Appl. No.: 18/357,901

(22) Filed: Jul. 24, 2023

(65) Prior Publication Data

US 2024/0078810 A1 Mar. 7, 2024

(30) Foreign Application Priority Data

Sep. 7, 2022 (KR) .................. 10-2022-0113636

(51) Int. Cl.
*G06V 20/50* (2022.01)
*G06V 10/75* (2022.01)
*G06V 10/764* (2022.01)

(52) U.S. Cl.
CPC ............ *G06V 20/50* (2022.01); *G06V 10/759* (2022.01); *G06V 10/765* (2022.01); *G06V 2201/07* (2022.01)

(58) Field of Classification Search
CPC .... G06V 20/50; G06V 10/759; G06V 10/765; G06V 2201/07
See application file for complete search history.

(56) References Cited

U.S. PATENT DOCUMENTS 11,120,557 B1 * 9/2021 Klose ..................... G06N 3/08
2019/0065910 A1 * 2/2019 Wang ................... G06V 10/82
(Continued)

FOREIGN PATENT DOCUMENTS

| KR | 10-2296274 B1 | 9/2021 |
| KR | 10-2378887 B1 | 3/2022 |
| KR | 10-2022-0092361 A | 7/2022 |

OTHER PUBLICATIONS

Korean Office Action dated Nov. 15, 2022, issued to corresponding Korean Application No. 10-2022-0113636.

*Primary Examiner* — Ming Y Hon
(74) *Attorney, Agent, or Firm* — Stein IP, LLC

(57) ABSTRACT

Disclosed herein are image-based object recognition method and system by and in which a learning server performs image-based object recognition based on the learning of environment variable data. The image-based object recognition method includes: receiving an image acquired through at least one camera, and segmenting the image on a per-frame basis; primarily learning labeling results for one or more objects in the image segmented on a per-frame basis; performing primary reasoning by performing object detection in the image through a model obtained as a result of the primary learning; performing data labeling based on the results of the primary reasoning, and performing secondary learning with weights allocated to respective boxes obtained by the primary reasoning and estimated as object regions; and finally detecting one or more objects in the image through a model generated as a result of the secondary learning.

6 Claims, 3 Drawing Sheets

(56) References Cited

U.S. PATENT DOCUMENTS

| | | | |
|---|---|---|---|
| 2019/0130601 A1* | 5/2019 | Kavulya | G06T 7/73 |
| 2021/0034865 A1* | 2/2021 | Nord | G06V 10/809 |
| 2021/0225065 A1* | 7/2021 | Holzer | H04N 13/282 |
| 2023/0078218 A1* | 3/2023 | Wang | G06N 3/098 |
| | | | 706/12 |
| 2023/0186668 A1* | 6/2023 | Dong | G06F 40/114 |
| | | | 382/176 |
| 2023/0274527 A1* | 8/2023 | Chen | G06F 18/214 |
| | | | 382/181 |
| 2023/0281974 A1* | 9/2023 | Ramamonjison | G06V 10/764 |
| | | | 382/157 |
| 2023/0282000 A1* | 9/2023 | Pang | G06V 20/58 |
| | | | 382/103 |

* cited by examiner

IMAGE-BASED OBJECT RECOGNITION METHOD AND SYSTEM BASED ON LEARNING OF ENVIRONMENT VARIABLE DATA

CROSS-REFERENCE TO RELATED APPLICATION

This application claims the benefit of Korean Patent Application No. 10-2022-0113636 filed on Sep. 7, 2022, which is hereby incorporated by reference herein in its entirety.

BACKGROUND

1. Technical Field

The present invention relates to an image-based object recognition method and system based on the learning of environment variable data, and more particularly, to a method and system for improving an object recognition rate by utilizing the changing environment variable data of a specific industrial domain for learning when image-based object recognition technology is applied to the specific industrial domain.

2. Description of the Related Art

Image-based object recognition technology that recognizes an object such as a thing, a vehicle, or a person using a camera sensor such as a CCTV camera is currently used in various industrial fields such as the construction, autonomous driving, and face recognition fields.

Recently, there has been proposed a method of recognizing an object in an image, recorded at a site, by using an artificial intelligence algorithm.

To recognize an object, features of the object are first defined, data is labeled, and then learning is performed. Next, the object is automatically recognized using learning results in a detector or classifier.

In this automatic recognition system, extraction target features of an object and how to extract the features are significantly important factors, and have a great impact on the performance of a recognizer. However, unfortunately, so far, guidelines for features that satisfy commercialization-level performance have not been proposed.

The steps of determining the performance of an object recognition model can be divided into the step of collecting data and the step of extracting features from the data. According to the conventional method, information about learning data is already determined in the step of collecting data at a specific site, and the weights of a model are determined after the learning of the model. The weight values of the recognizer do not change even when environment variables in a detection target image are changed. That is, overfitting occurs in specific environment variables of data used for actual learning, resulting in a decrease in the recognition rate in an actual environment having different environment variable characteristics. This inevitably leads to a problem in which the commercialization of an image-based object recognition model becomes impossible.

In fact, in industrial sites, due to variables such as weather, variables that may occur in connection with the angle of view of a camera or the distance to a target to be detected, and variables based on image features of a target environment (e.g., a mountain, an urban environment, a roadside, a construction site, a beach, an indoor area, or the like), the object recognition rate is inevitably lowered.

Therefore, in order to improve the performance and processing speed of the recognizer, technology capable of responding to changes in environment variables is required.

SUMMARY

An object of the present invention is to overcome the problems of the prior art described above.

An object of the present invention is to perform labeling and re-learning based on primary object recognition results, performed based on primary learning results, in order to incorporate environment variables at an industrial site, in which case a stable recognition rate is achieved by applying different weights to the respective primary object recognition results according to their reliability.

The objects of the present invention are not limited to the objects mentioned above, and other objects not mentioned will be clearly understood from the following description.

According to an aspect of the present invention, there is provided an image-based object recognition method, by which a learning server performs image-based object recognition based on the learning of environment variable data, the image-based object recognition method including: receiving an image acquired through at least one camera, and segmenting the image on a per-frame basis; primarily learning labeling results for one or more objects in the image segmented on a per-frame basis; performing primary reasoning by performing object detection in the image through a model obtained as a result of the primary learning; performing data labeling based on the results of the primary reasoning, and performing secondary learning with weights allocated to respective boxes obtained by the primary reasoning and estimated as object regions; and finally detecting one or more objects in the image through a model generated as a result of the secondary learning.

Performing the secondary learning may include applying different weights to the respective boxes according to their accuracy obtained by the primary reasoning.

Performing the secondary learning may include calculating each of the weights to be applied to the respective first boxes based on values that are obtained based on an overlap area between a corresponding one of the first boxes obtained by the primary reasoning and a second box most closely matching the truth, the distance between the central point of the first box and the central point of the second box, and the aspect ratio of the first box.

According to an aspect of the present invention, there is provided an image-based object recognition system, including: an image reception unit configured to receive an image acquired through at least one camera and segment the image on a per-frame basis; a primary learning unit configured to primarily learn labeling results for one or more objects in the image segmented on a per-frame basis; a primary reasoning unit configured to perform primary reasoning by performing object detection in the image through a model obtained as a result of the primary learning; a secondary learning unit configured to perform data labeling based on the results of the primary reasoning and perform secondary learning with weights allocated to respective boxes obtained by the primary reasoning and estimated as object regions; and a secondary reasoning unit configured to finally detecting one or more objects in the image through a model generated as a result of the secondary learning.

According to an embodiment of the present invention, site environment variables are incorporated by performing re-learning based on primary reasoning results obtained through a model generated as a result of primary learning. Furthermore, secondary learning is performed based on primary learning results, so that learning is automatically performed without an additional data labeling process. Therefore, even when an environment in which an object is to be detected changes, a high object recognition rate is achieved in each environment.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
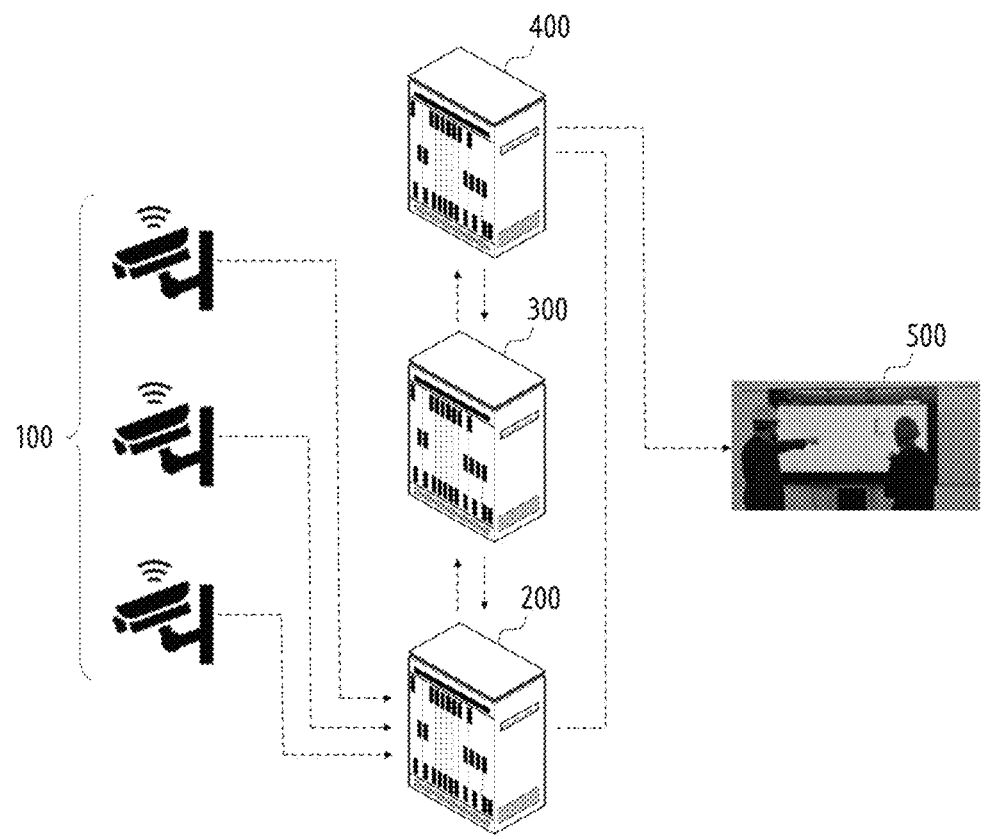
FIG. 1 is a drawing schematically showing the configuration of an image-based object recognition system based on the learning of environment variable data according to an embodiment of the present invention.

The following detailed description of the present invention refers to the accompanying drawings that illustrate specific embodiments, through which the present invention can be practiced, by way of example. These embodiments are described in sufficient detail to enable those skilled in the art to practice the present invention. It should be understood that the various embodiments of the present invention are different from each other but are not necessarily mutually exclusive. For example, specific shapes, structures, and characteristics described as being included in one embodiment herein may be implemented in another embodiment without departing from the spirit and scope of the invention. Additionally, it should be understood that the locations or arrangements of individual components within each disclosed embodiment may be changed without departing from the spirit and scope of the invention. Accordingly, the detailed description set forth below is not to be taken in a limiting sense, and the scope of the present invention is limited only by the attached claims and all equivalents to the attached claims if appropriately described. Like reference numerals in the drawings denote the same or similar function throughout various aspects.

Hereinafter, embodiments of the present invention will be described in detail with reference to the accompanying drawings so that those skilled in the art can easily practice the present invention.

FIG. 1 is a drawing schematically showing the configuration of an image-based object recognition system based on the learning of environment variable data according to an embodiment of the present invention.

Referring to FIG. 1, the image-based object recognition system according to the present embodiment may include cameras 100, a learning server 200, a storage server 300, a web server 400, and an administrator terminal 500.

The cameras 100 are a component for acquiring images by photographing scenes, such as closed-circuit television (CCTV) cameras. As an example, the cameras 100 may be deployed in multiple places of an industrial site. The images acquired by the cameras 100 are transmitted to the learning server 200 in real time. Such transmission may be performed through Real-Time Streaming Protocol (RTSP), which is a protocol that is preferably used to receive low-latency images.

The learning server 200 segments the data, transmitted from the cameras 100, on a per-frame basis, and detects one or more objects using a trained model. The learning server 200 according to an embodiment goes through a process of learning environment variables, and stores appropriate model weight values for each site, obtained through the process, in the storage server 300. Since the characteristics of each site are stored as a file, a high recognition rate is achieved in an actual site based on newly stored model weight values.

The storage server 300 collects and stores various types of structured and unstructured data such as original images obtained by the cameras 100, model weight values obtained based on the above-described environment variables, and specific event information.

The web server 400 provides low-latency images to the administrator terminal 500 in real time without any software or plug-in by using a web Real-Time Communication (RTC) method.

The administrator terminal 500 performs a function of receiving information about the images and the objects detected in the images from the web server 400 and displaying the information in a form in which an administrator can check the information.

Figure 2:
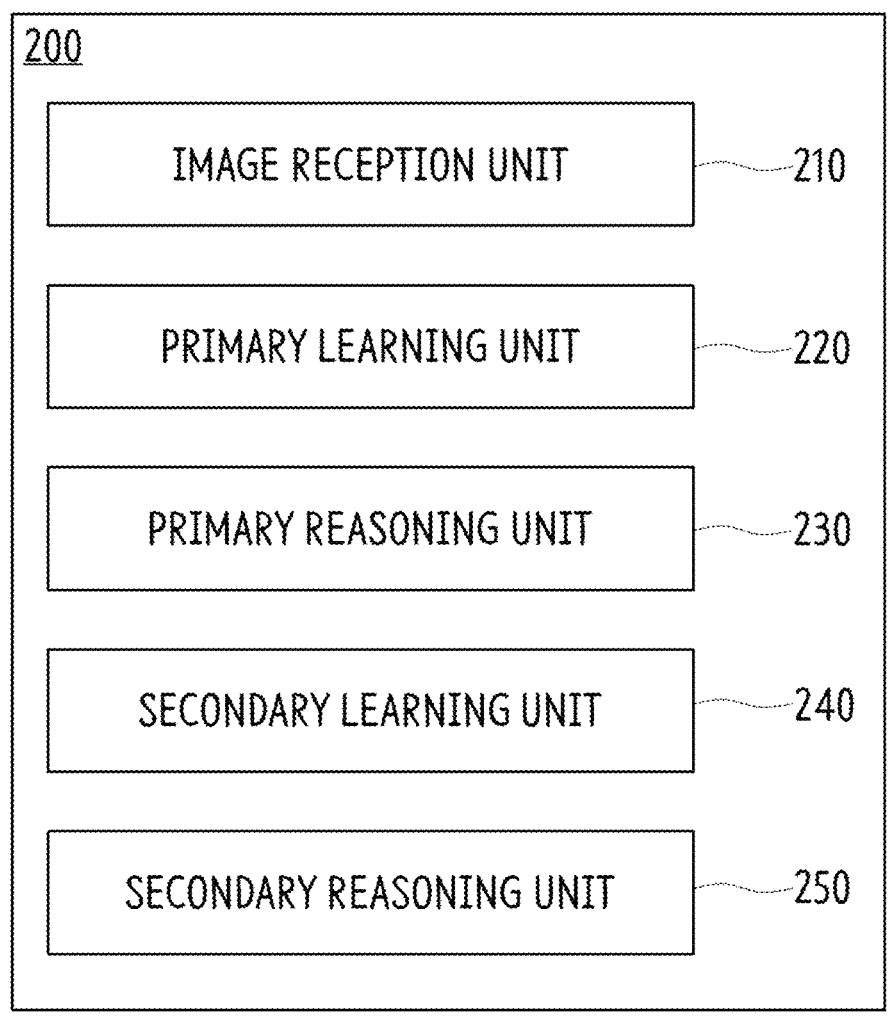
FIG. 2 is a block diagram illustrating the configuration and operation of a learning server according to an embodiment of the present invention.

FIG. 2 is a block diagram illustrating the configuration and operation of a learning server according to an embodiment of the present invention.

Referring to FIG. 2, the learning server 200 may include an image reception unit 210, a primary learning unit 220, a primary reasoning unit 230, a secondary learning unit 240, and a secondary reasoning unit 250.

The image reception unit 210, the primary learning unit 220, the primary reasoning unit 230, the secondary learning unit 240, and the secondary reasoning unit 250 may be program modules or hardware capable of communicating with an external device. These program modules or hardware may be included in the learning server 200 in the form of an operating system, application program modules, and/or other program modules, and may be physically stored on various known storage devices. Meanwhile, these program modules or hardware include, but are not limited to, routines, subroutines, programs, objects, components, data structures, etc. that perform specific tasks or execute specific abstract data types to be described later according to the present invention.

The image reception unit 210 performs a function of receiving the images taken by the cameras 100. The image reception unit 210 may further perform a function of segmenting the received images on a per-frame basis.

The primary learning unit 220 performs a function of primarily learning data labeling results for the objects inside the images for the images segmented on a per-frame basis. The data labeling used for the primary learning may be performed by a human. For example, labeled data for a person, a machine, a forklift, a truck, an excavator, a bulldozer, and/or the like may be obtained from individual images, and the primary learning unit 220 may learn this labeled data. In this process, a known learning algorithm such as a convolutional neural network (CNN) may be used. When the primary learning is completed, a primary model for object detection may be generated.

The primary reasoning unit 230 performs a function of reasoning out one or more objects detected in the images acquired by the image reception unit 210 through the primary model acquired by the primary learning unit 220. As the primary reasoning results, there are generated one or more boxes for one or more regions in which the one or more objects are present in the images.

Figure 3:
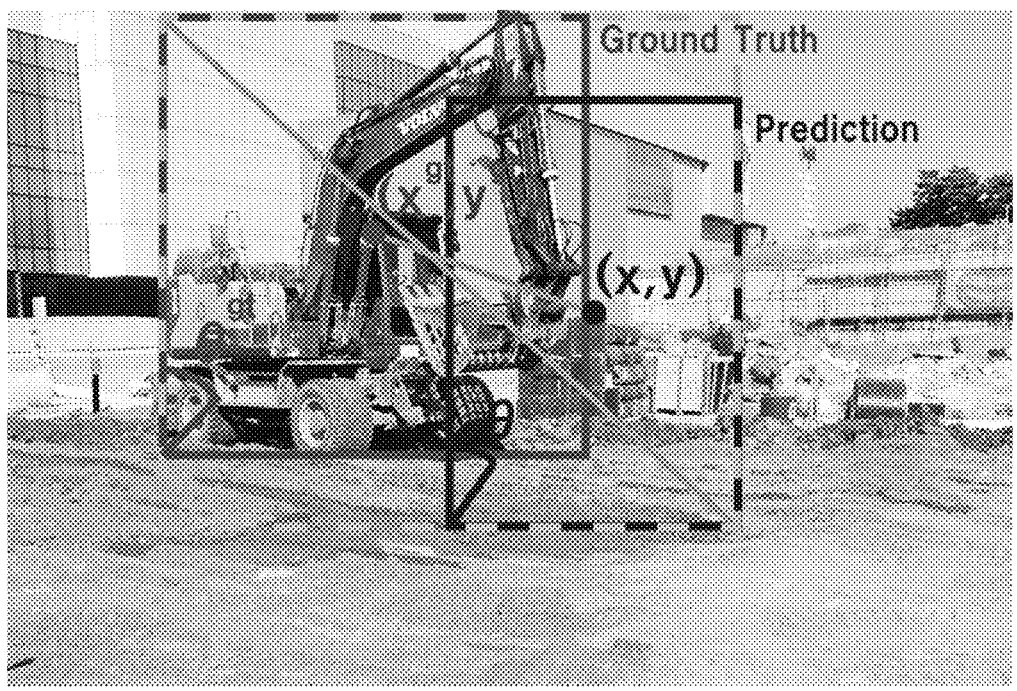
FIG. 3 is a view showing an example of primary reasoning results according to an embodiment of the present invention.

FIG. 3 is a view showing an example of primary reasoning results according to an embodiment of the present invention.

In FIG. 3, blue and red boxes are boxes that are generated as primary reasoning results.

The secondary learning unit 240 performs learning by using the primary reasoning results, obtained by the primary reasoning unit 230, as labeled data.

As described above, a plurality of boxes are generated in the image as the primary reasoning results. The secondary learning unit 240 uses labeled data for learning with a low reliability, i.e., a low weight, applied thereto when the box-shaped labeled data generated as primary reasoning results has a high probability of being wrong. When the probability that labeled data is correct is high, the labeled data is used for learning with a high reliability, i.e., a high weight, applied thereto.

In the above description, reliability may be calculated as a Complete-IoU (CIoU) value.

The CIoU value can be used to calculate a loss value using three factors: an overlap area, a central point distance, and an aspect ratio. The overlap area refers to the overlap area between a box generated as a primary reasoning result and a box most closely matching the truth.

$$V = \frac{4}{\pi^2}(\theta^{gt} - \theta)^2$$

$$CIoU_i = IoU_i - \frac{d^2(p^{gt}, p)}{c^2} - \alpha_i V$$

$$\alpha_i = \begin{cases} 0 & \text{if } IoU < 0.5 \\ \frac{V}{(1 - IoU_i) + V} & \text{if } IoU \geq 0.5 \end{cases}$$

In the above equation, d denotes the distance between the central point of a blue box (any one of the boxes obtained as the primary reasoning results) and the central point of a red box (a box having the highest reliability among the boxes obtained as primary reasoning results, which accurately contains a detection target and most closely matches the truth), $\theta^{gt}$ denotes the arctangent value of $$\frac{w^{gt}}{h^{gt}},$$

and θ denotes the arctangent value of w/h. In this case, w and h are the width and height values of the box obtained as the primary reasoning result, respectively.

Meanwhile, p denotes the coordinates (x, y) of the central point of the blue box in FIG. 3, and $p^{gt}$ denotes the coordinates $(x^{gt}, y^{gt})$ of the central point of the red box.

In addition, $IoU_i$ is an overlap area-based weight, $$\frac{d^2(p^{gt}, p)}{c^2}$$

is a distance-based weight, and $\alpha_i V$ is an aspect ratio-based weight.

Subscript i refers to a parameter related to the i-th one of the plurality of boxes that are generated as the primary reasoning results.

IoU is an index indicating how much two areas overlap each other in the object detection field of machine learning, and is used as an evaluation index in object detection. The larger the IoU value, the larger the overlap between a correct answer area and a predicted area and the higher the reliability of object detection.

In an embodiment of the present invention, the RoI re-weighting application method solves the domain uncertainty problem based on CIoU as follows:

$$w_i = \alpha + (1-\alpha)e^{-be^{-c(CIoU_i)}}$$

In the above equation, $CIoU_i$ is the maximum CIoU value between the RoI of the box obtained as a primary reasoning result and the RoI of the box most closely matching the truth. The a, b, and c values are arbitrary values, which may be preset parameters. The weight $w_i$ is a weight that is applied to each $RoI_i$ obtained as a primary reasoning result.

The secondary learning unit 240 uses the primary reasoning results as labeled data through the above method and performs a function of allocating a weight to each of the reasoning results according to its reliability. The weights generated in this manner, i.e., re-weights, may be stored in the storage server 300.

The secondary reasoning unit 250 performs a function of detecting one or more objects in the image through a model generated through learning by the secondary learning unit 240.

According to an embodiment of the present invention, site environment variables are incorporated by performing re-learning based on the primary reasoning results obtained through a model generated as a result of primary learning. In addition, secondary learning is performed based on the primary learning results, so that learning is automatically performed without an additional data labeling process. Therefore, even when an environment in which an object is to be detected changes, a high object recognition rate is achieved in each environment.

The above description of the present invention is intended for illustrative purposes, and those skilled in the art can understand that the embodiments described herein may be easily modified into other specific forms without departing from the technical spirit or essential features of the present invention. Accordingly, the embodiments described above should be understood as illustrative but not limitative in all respects. For example, each component described as a single form may be implemented in a distributed manner, and similarly, components described as distributed may be implemented in a combined form.

The scope of the present invention is defined by the attached claims, and all changes or modifications derived from the meanings and scope of the claims and equivalents to the claims should be interpreted as being included in the scope of the present invention.

What is claimed is:

1. An image-based object recognition method, by which a learning server performs image-based object recognition based on learning of environment variable data, comprising:
    receiving an image acquired through one or more cameras and segmenting the image on a per-frame basis;
    primarily learning labeling results for one or more objects in the image segmented on a per-frame basis;

performing object detection in the image through a model obtained from the primary learning and generating first boxes for regions in which objects are present in the image;

allocating a weight to labeled data according to a reliability of the labeled data in the shape of each of the first boxes generated from the performing object detection;

performing secondary learning for the results of the performing object detection with weights allocated thereto; and finally detecting one or more objects in the image through a model generated from the performing secondary learning, wherein the allocating a weight comprises calculating each of the weights to be applied to the respective first boxes based on values that are obtained based on an overlap area between a corresponding one of the first boxes obtained in the performing object detection and a second box most closely matching a truth, a distance between a centroid of the first box and a centroid of the second box, and an aspect ratio of the first box.

2. The image-based objection recognition method of claim 1, wherein the reliability of the labeled data is calculated as a Complete-IoU (CIoU) value.

3. The image-based objection recognition method of claim 2, wherein the CIoU value is used to calculate a loss value using an overlap area, a central point distance, and an aspect ratio.

4. An image-based object recognition system, comprising:
an image reception unit configured to receive an image acquired through one or more cameras and segment the image on a per-frame basis;
a primary learning unit configured to primarily learn labeling results for one or more objects in the image segmented on a per-frame basis;
a primary reasoning unit configured to perform object detection in the image through a model obtained from the primary learning and generate first boxes for regions in which objects are present in the image;
a secondary learning unit configured to allocate a weight to labeled data according to reliability of the labeled data in the shape of each of the first boxes generated from the performing object detection and perform secondary learning for results of the performing object detection with weights allocated thereto; and
a secondary reasoning unit configured to finally detect one or more objects in the image through a model generated from the performing secondary learning,
wherein the secondary learning unit is further configured to calculate each of the weights to be applied to the respective first boxes based on values that are obtained based on an overlap area between a corresponding one of the first boxes obtained by the primary reasoning unit in the performing object detection and a second box most closely matching a truth, a distance between a centroid of the first box and a centroid of the second box, and an aspect ratio of the first box.

5. The image-based objection recognition system of claim 4, wherein the reliability of the labeled data is calculated as a Complete-IoU (CIoU) value.

6. The image-based objection recognition system of claim 5, wherein the CIoU value is used to calculate a loss value using an overlap area, a central point distance, and an aspect ratio.

* * * * *